Oct. 18, 1932.   J. DAVIDSON   1,882,781
COOKER
Filed May 19, 1931   4 Sheets-Sheet 2
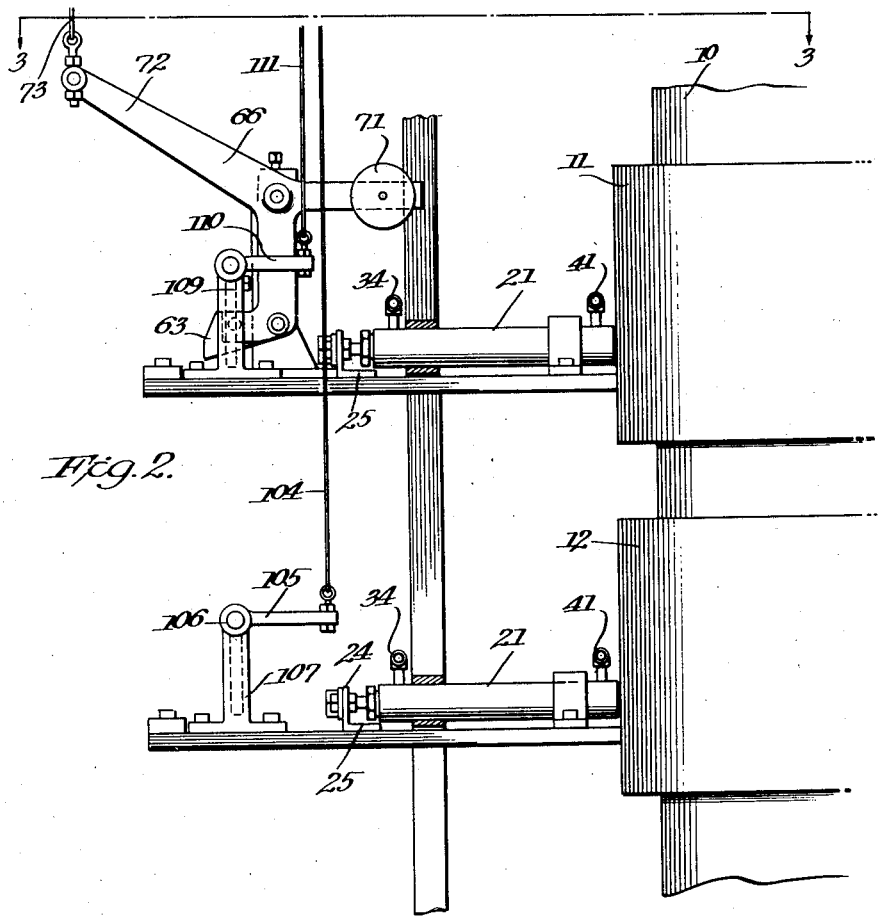
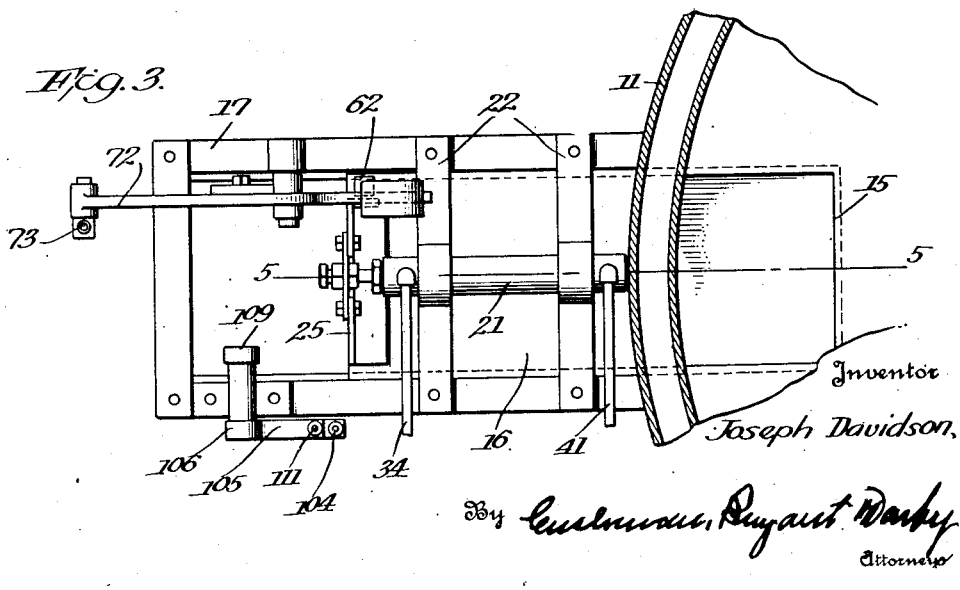
Inventor
Joseph Davidson, Oct. 18, 1932.  J. DAVIDSON  1,882,781
COOKER
Filed May 19, 1931   4 Sheets-Sheet 3
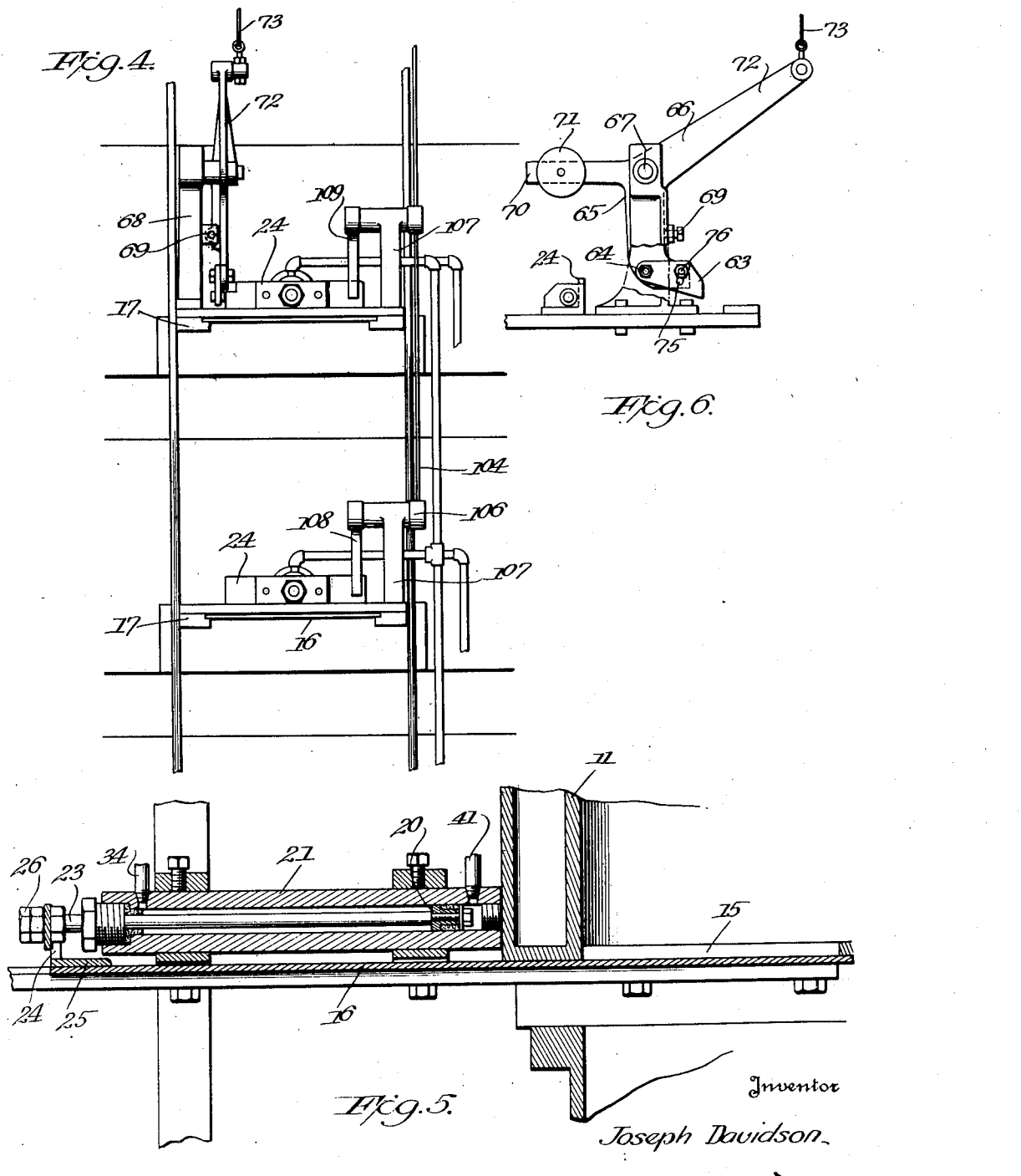

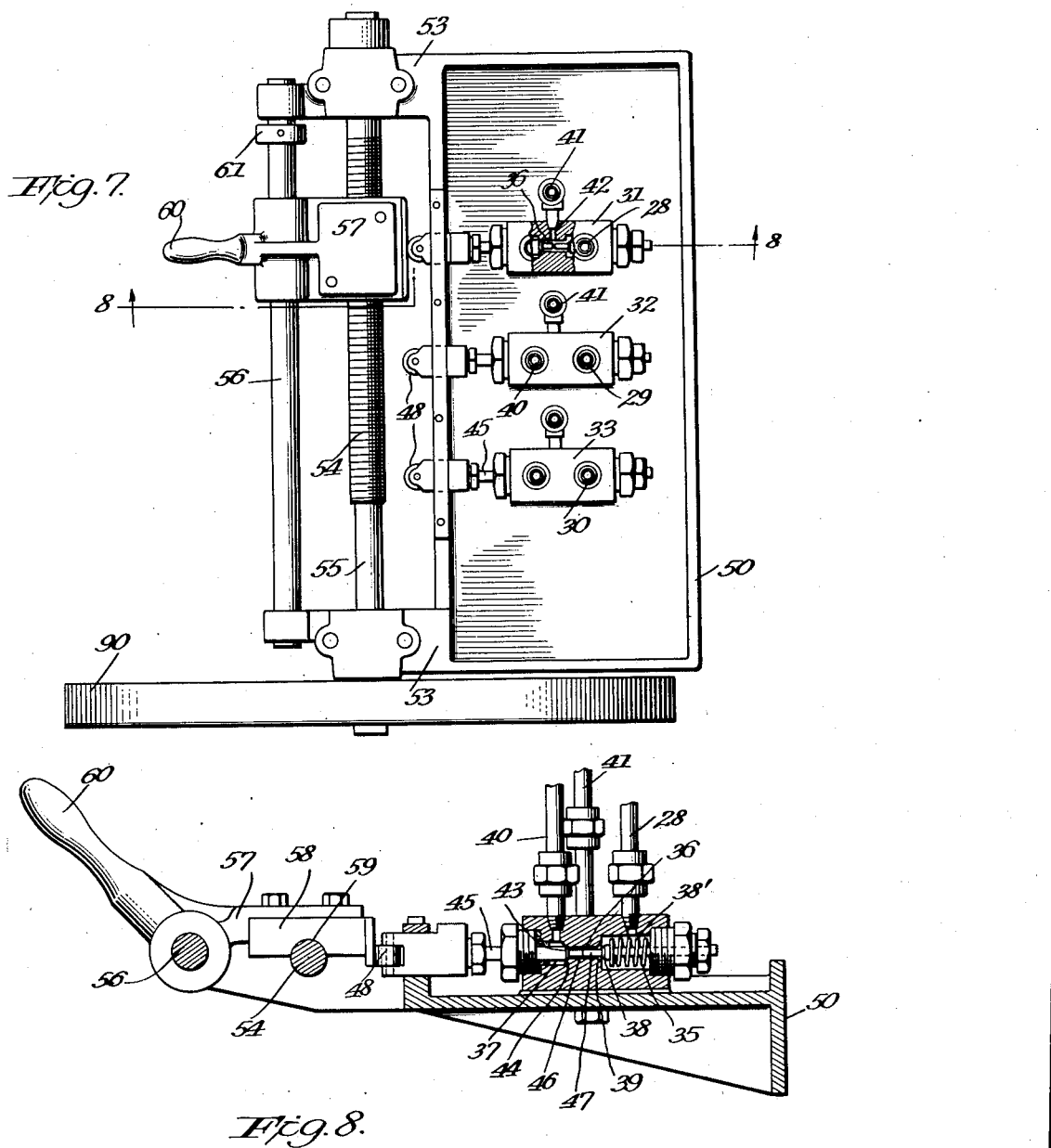

Patented Oct. 18, 1932

1,882,781

UNITED STATES PATENT OFFICE

JOSEPH DAVIDSON, OF ATLANTA, GEORGIA, ASSIGNOR TO DAVIDSON-KENNEDY COMPANY, OF ATLANTA, GEORGIA, A CORPORATION OF GEORGIA

COOKER

Application filed May 19, 1931. Serial No. 538,577.

The present invention relates to improvements in the construction and operation of cookers and more especially to that type of cooker used for treating oleaginous material and other oil-bearing meats, such as cotton seeds and nuts preparatory to the extraction of the oil therefrom. These improvements are principally related to the cooker as shown and described in my Patent No. 1,782,714, dated November 25, 1930.

An important object of the invention is to provide a simple, efficient, and compact cooker in which means are provided for delivering and discharging a predetermined quantity of material into each kettle at fixed intervals so that all the material passing from one kettle to the other is subjected to the same treatment as to time and temperature thus providing a more uniformly cooked product which will yield a larger quantity of oil when pressed than seeds or meal less uniformly cooked.

A further object comprehends the provision of a fluid actuated motor or piston which is operatively connected to the gates of each of the kettles and has means associated therewith for sequentially actuating the gates, at predetermined intervals so that when the contents of one kettle is being discharged into the adjacent lower kettle, the supply of the upper adjacent kettle is cut off therefrom.

Another object of the invention consists in providing a movable member arranged to actuate a series of valves in sequential or selective order which valves are operatively connected to the pistons that control the movement of the slide gates in each of the kettles or cookers, so that upon the actuation of the movable member, means are provided for discharging and refilling each kettle with a predetermined quantity of material, said means insuring each batch of material to be uniformly treated, and remain in each kettle a fixed period of time.

A further object consists in providing means for cutting off the supply of steam to hollow sweep shaft of the kettle when the material is being discharged therefrom.

Other objects and advantages of the invention will become apparent from the following description when taken in conjunction with the following claims.

Referring to the drawings in which is shown a preferred embodiment of the invention:

Figure 2 is an enlarged sectional view of parts shown in Figure 1.

Figure 3 is a sectional view taken substantially along the line 3—3 of Figure 2.

Figure 4 is a side elevation of the parts shown in Figure 2.

Figure 5 is a sectional view taken substantially along the line 5—5 of Figure 3.

Figure 6 is an end view of the upper portion of the parts shown in Figure 4.

Figure 7 is an enlarged sectional view taken substantially along the line 7—7 of Figure 1; and Figure 8 is a sectional view taken substantially along the line 8—8 of Figure 7.

Figure 1:
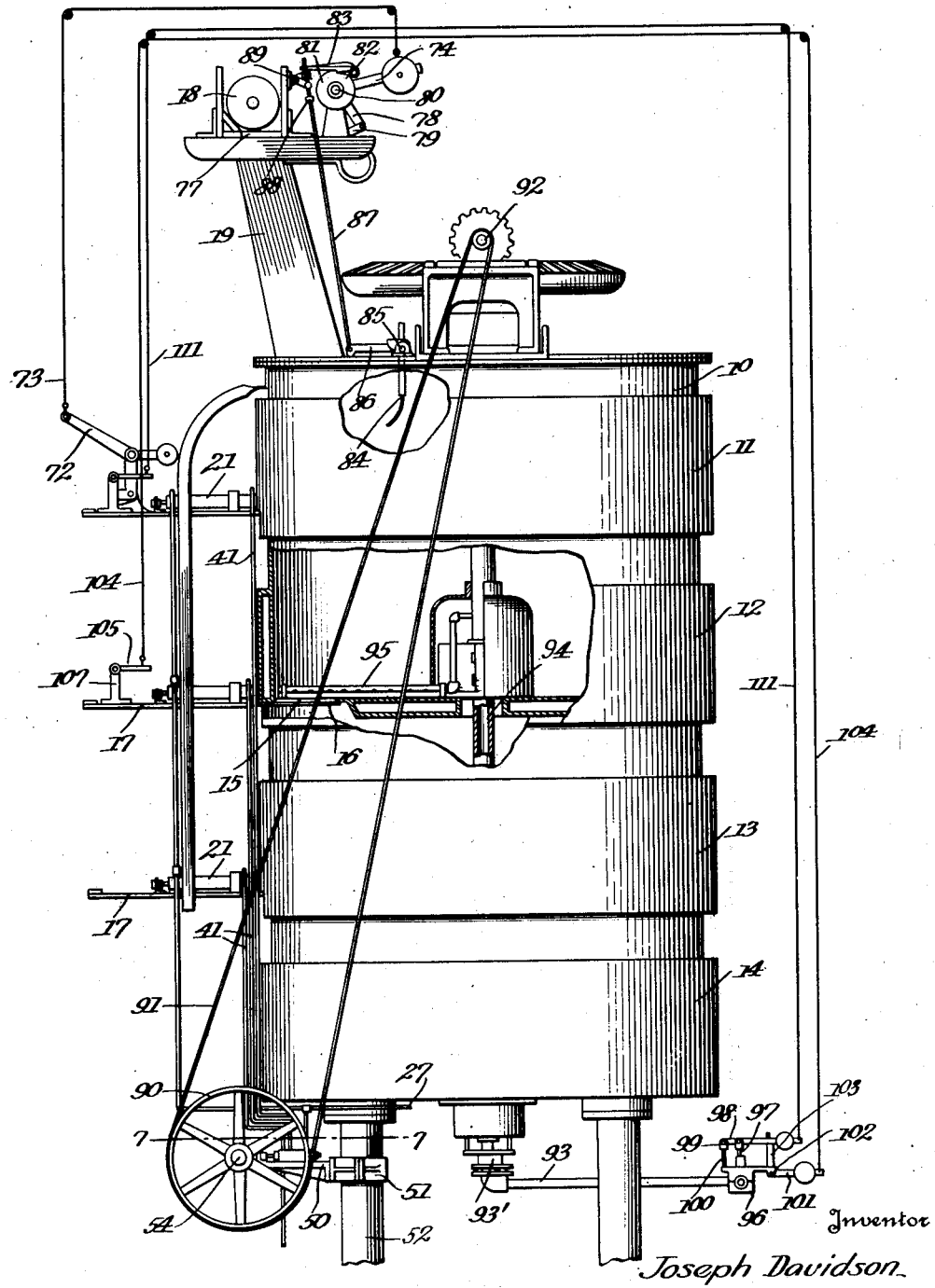
Figure 1 is a side elevation of a cooker with the invention applied thereto showing parts in section for the purpose of clearness of illustration.

Referring to the drawings in which like numerals indicate like parts in the several views, 10 indicates a cooker of any suitable size, shape and dimension which may be used for cooking oleaginous material and other oil-bearing meats such as cotton seeds and nuts, preparatory to extracting the crude oil therefrom, and is preferably composed of a series of superimposed kettles 11, 12, 13 and 14, each of which has an opening 15 in the bottom thereof for communicating adjacent kettles with one another. The kettles 11, 12 and 13 constitute the cooking or treating kettles or compartments while the kettle 14 may constitute a receiving kettle from which the cooked material may be discharged.

The supply and discharge of the material through the openings 15 of each of the kettles 11, 12 and 13, is preferably controlled by a slidable gate 16 that is supported by a frame 17 (Fig. 3) connected to the outside of the cooker.

The material to be treated is conducted from any suitable source of supply by the conveyor 18 (Fig. 1) and the pipe or chute 19 to the top kettle 11, in a manner which will be subsequently described.

In order that material may be subjected to a uniform treatment throughout its passage through the cooker, and to insure that each batch of material will be treated for the same interval of time and at an even temperature, each of the gates 16 is arranged to be actuated by a reciprocating piston 20 mounted in the cylinder 21 that is connected to the frame 17 by the straps 22 (Fig. 3). The stem 23 of the piston has its outer end extending through a vertical flange 24 of an angle plate 25 that is secured to the slidable gate 16 and the stem may be maintained in a fixed position by the locking nuts 26, arranged on opposite sides of the flange 24.

Hydraulic or fluid pressure of any kind, also steam, compressed air or the like, is conducted to and from each of the cylinders 21 through a supply pipe 27 which has branch connecting pipes 28, 29 and 30 that communicate respectively with each of the valve casings 31, 32, and 33 (Fig. 7). The supply pipe 27 continues past the valve casings 31, 32 and 33, so as to communicate through the pipes 34 with the front end of the pistons 20.

Each of the valve casings 31, 32 and 33 is provided with a chamber 35 (Fig. 8) into which one of the supply pipes 28, 29 or 30 delivers, and this chamber communicates through a restricted port 36 with a discharge chamber 37. A valve 38 in the chamber 35 is arranged to engage a seat 39 formed in the wall of the port 36 so as to control the flow of the supply through said port to either the discharge pipe 40 or to one end of a pipe 41 which communicates through the lateral passage 42 (Fig. 7) with the port 36. The pipe 41 communicates at its opposite end with the rear of the piston 20 in each of the cylinders 21. A spring 38' normally urges the valve 38 into engagement with its seat. A valve 43 in the chamber 37 is arranged to engage a seat 44 formed in the adjacent wall of the port 36 and its stem 45 has a reduced portion 46 which aligns with and abuts a complementary stem 47 on the valve 38. The outer end of each of the valve stems 45 has connected thereto a roller 48 which extends through the vertical flange 49 of the valve supporting structure 50. The support 50 may be connected to a bracket 51 carried by the legs 52 (Fig. 1). Spaced arms 53 connected to the supporting structure 50 act as bearings for a revoluble threaded shaft or screw 54 that has at one end a smooth portion 55. The arms 53 also support a rod 56 on which is slidably mounted a valve actuating member 57 that may have a block or cam 58 having a concave threaded surface 59 in the bottom thereof (Fig. 8) arranged to engage the complementary threads on the shaft 54 so as to be moved axially relative thereto. The member 57 is provided with a handle 60 for moving the block 58 into and out of engagement with the shaft 54 so as to permit the member 57 to slide axially on the rod 56 independently of the shaft 54 when the block 58 is moved out of engagement with the shaft.

The exposed face of the block 58 is arranged to sequentially engage each of the rollers 48 carried by the stems 45 of the valves 43 in the casings 31, 32 and 33, when the member 57 is moved by the shaft 54 towards the smooth portions 55.

In the normal position of the valves in each of the casings 31, 32 and 33, that is to say, when the block 58 is moved so as not to engage the roller 48, the valve 38 in the chamber 35 is closed by the tension of the spring 38' so as to cut off the flow of the supply from the pipe 28 through the port 36 to the pipe 41 that communicates with the inner or rear end of each of the cylinders 21. Upon the block 58 being moved to engage one of the rollers 48, the stem 45 is moved axially so as to move the valve 43 into engagement with the seat 44 and at the same time force the valve 38 away from its seat. When the member 57 has passed the roller 48, the spring 38' will close the valve 38 and also force the valve 43 away from engagement with its seat 44, so as to communicate pipe 41 with the discharge pipe 40 through the port 36, thus allowing the pressure in the pipe 41 to escape. This causes a preponderance of pressure to be established at the front end of the cylinder, which moves the piston 20 to close the slide gate 16.

By reason of this arrangement of parts the material is discharged from one kettle to the other at predetermined intervals that may be varied as conditions warrant. When the cooker is used for treating oleaginous material, these intervals may be changed to any time desired, depending upon how often the cooked seed or meal is to be taken from the bottom or receiving kettle 14, and conducted to the presses. When the proper time has elapsed which is usually indicated by a clock or automatic bell, the operator depresses the handle 60 of the member 57 so as to lift the block 58 from engagement with the threaded shaft 54 and slides the member 57 back on the rod 56 to the starting position, that is, until it strikes the stop collar 61. The member 57 is then brought into engagement with the revolving threaded shaft 54 which moves the face of the block 58 forwardly bringing it successively into contact with each of the rollers 48 associated with the valve casings 31, 32 and 33 that control the flow of pressure to the cylinders 21 of each of the kettles 11, 12, and 13. As the block 58 engages the roller 48 connected to the stem 45 of the valve casing 31, the stem is moved inwardly to cause the engagement of the valve 43 with its seat, and also moves the valve 38 in the chamber 35 away from its seat, thus permitting the supply of pressure from the pipe 28 to pass through the port 36 to the pipe 41, and be delivered to the back end of the piston 20 that controls the actuation of the gate in the lower kettle 13. The area of the cylinder 21 adjacent the back end of the piston 20 is larger than the front end, so that the pressure admitted to the cylinder through pipe 41 is greater than the standing pressure on the opposite side of the piston, which causes the piston to move the valve gate 16 of the kettle 13 to its opened position so that the material in the kettle 13 may pass through the opening 15 into the receiving kettle 14. Of course during this operation, the pistons in the kettles 11 and 12 are in their normal closed position due to the standing pressure in the pipe 34 maintaining the piston 20 in its innermost position as shown in Fig. 5. The gate 16 of the kettle 13 remains open until the member 57 has traveled past roller 48 and when it has passed this point, the spring 38' closes the valve 38 and at the same time, pushes valve 43 away from its seat, thus allowing the remaining pressure in the pipe 41 to escape through the port 36 and chamber 37 to the discharge pipe 40. The standing pressure in the pipe 34 in front of the piston 20 now being greater, causes the gate 16 to be moved to its closed position. By this time the member 57 has continued its forward movement and comes in contact with roller 48 on the next valve stem that is associated with casing 32 which operates the gate 16 of the kettle 12 in substantially the same manner as the gate in kettle 13. The gate in kettle 11 is then similarly operated.

The parts are so arranged that the first gate to operate, discharges the contents of kettle 13 into the bottom or receiving kettle 14 and as soon as the gate in kettle 13 closes, the next gate above it in kettle 12 operates and discharges contents of kettle 12 into kettle 13; then as soon as gate in kettle 12 closes, the next gate above in kettle 11 discharges contents of kettle 11 into kettle 12.

As the gate in kettle 11 closes, a roller 62 carried by said gate comes in contact with a latch 63 pivoted as at 64 to a depending arm 65 of a rocker bar 66. The bar 66 is pivotally mounted as at 67 to the standard 68 carried by the frame 17, and the outward movement of the arm 65 may be limited by an adjustable stop 69 that extends laterally from the standard 68. The bar 66 is provided with a normally disposed horizontal arm 70 that carries a weight 71 and an inclined arm 72 which is connected by the flexible member or cable 73 to a weighted arm 74 for the purpose which will be subsequently described.

The latch 63 is provided with an arcuately shaped slot 75 in which extends a bolt 76 carried by the arm 65 for limiting the movement of the latch about its pivot 64. It will be seen that when the gate 16, that controls the flow of the supply from the kettle 11 to the kettle 12, is moved outwardly, so as to bring the gate to its open position, that the latch 63 will permit the roller 62 attached to the gate 16 to pass thereunder without disturbing the position of the rocker arm 66 and its associated parts. However, when the piston 20 moves the gate to its closed position, the latch 63 falls in the path of the roller 62 so as to be moved a limited distance therewith, and cause the rocker arm 66 to swing about its pivot 67 until the gate has reached the point where the latch 63 is free from engagement with the roller 62. When this point is reached, the weight 71 causes the rocker arm 66 to be returned to its normal position as shown in Fig. 2.

The supply of material from the conveyor 18 to the kettle 11 is controlled by a gate 77 which is connected to the depending arm 78 of the bell crank lever 74 by a link 79 which in turn is keyed to a shaft 80, that carries a cam 81 provided with a detent 82 arranged to receive a locking pawl 83 for maintaining the gate 77 opened. As the gate in the kettle 11 closes, it causes the latch 63 to actuate the rocker arm 66 which depresses the incline arm 72 that is connected by the cable 73 to the weighted arm 74, thus raising the latter, which in turn causes the gate 77 to be opened and held in this position by the pawl 83 so as to allow the material from the conveyor 18 to pass through the trough 19 into the top of the kettle 11. When a predetermined quantity of the material is received by the kettle 11 as determined by the adjustable paddle 84, this paddle is swung about its pivot 85 so as to raise the arm 86 and rod 87 to which it is connected. The upward movement of the rod 87 causes the lug 88 thereon to engage a link 89 that raises the pawl 83 from engagement with the detent 82, the weighted arm 74 then swings downwardly to cause the closing of the gate 77.

The member 57, after it has traveled to the smooth end 55 of the shaft 54, remains there until the next interval of time has elapsed when the operator again depresses the handle 60 and moves the member 57 back against the starting collar 61 so as to repeat the same cycle of operation as heretofore described. The time the block 58 remains in engagement with each of the rollers 48, to move each of the gates in the kettles 11, 12, and 13 to their open position, is calculated and determined so as to insure each gate remaining open long enough to discharge the entire contents of each kettle and tests have revealed that generally one and one half minutes is sufficient for complete discharge. The length of time each gate is to remain open is governed by the revolutions of screw 54 which in turn controls the time that each block 58 remains in contact with the roller 48, this, of course, may be varied as conditions require. The shaft 54 may have a drive wheel 90 secured thereto so as to be connected by the belt 91 to the drive shaft 92 which rotates the sweeps in the kettles in the usual manner.

Steam may be supplied to each end of the kettles through the pipe 93 which is connected at 93' to the lower end of the revoluble hollow shaft 94 that extends medially through the cooker and communicates with the perforated pipes 95 that supply the steam directly into and at the bottom of contents of either one or more kettles, as may be required. In certain instances it has been found desirable to cut off the steam into certain of the kettles when the contents thereof is being emptied, and to turn the steam back on as soon as this kettle begins to refill. In order that this may be effected when the kettle 13 is being filled, there is provided in the pipe 93 a valve casing 96 in which is positioned a valve for controlling the steam to the sweep. The stem 97 of the valve is shown connected to a weighted lever 98 which is pivoted at 99 to a support 100 on the casing 96. Associated with the lever 98 is a right angle lever or rocking arm 101 which is pivoted as at 102 to the casing and has a vertical arm 103 arranged normally to support the lever 98 and maintain the valve and its stem 97 in its upward and opened position. The rocker arm 101 is connected by the cable 104 to an angle arm 105 that is pivoted at 106 to a support 107 on the frame 17 and has a depending vertical arm 108 arranged to be positioned in the path of the flange 24 when the gate 16 in the kettle 12 is moved to its open position, thus depressing the horizontal arm 105, which in turn raises the arm 101 so as to cause the lever 98 to be free from the arm 103 and to fall downwardly, thus causing the valve stem 97 to be moved to cut off the flow of steam through the hollow shaft 93 when the material is being delivered to the kettle 13.

When the discharge of the kettle 12 is completed, gate 16 in this kettle closes in a manner as previously described and immediately gate 16 in kettle 11 opens so as to refill kettle 12. The gate 16 in the kettle 11 is then opened by the member 57 on the shaft 54, moving the valve stem 45 in the casing 33 inwardly. This movement causes the flange 24 on the gate 16 of the kettle 11 to be brought into contact with the depending arm 109 of the rocker bar 110 that is connected by the cable 111 to the lever 98, which raises the lever 98 and the valve stem 97 so as to open the valve and allow the stem to pass through the hollow shaft 93 to the sweep in cooker. As soon as the lever 98 is raised, the cam 103 falls forward to engage the lever 97 and maintains it in its upward or open position, so that the valve controlling the flow of steam to the hollow shaft 93 will remain open until the gate in kettle 12 is opened again, to cause the actuation of the lever 101 and its associated parts.

In operation, the custom used in oil mills may be followed, and when the signal is given which usually is at predetermined intervals, the operator moves the valve actuating member 57 to the starting point at the collar 61 and the screw shaft 54 moves the block 58 into engagement with each of the rollers 48 so as to sequentially actuate the valves in the casings 31, 32 and 33 respectively. When the block 58 comes in contact with the first roller, that is to say, the one which actuates the valve stem in the casing 31, the gate 16 in the kettle 13 will be moved to its opened position and will remain open long enough to allow the entire charge of material from this kettle to empty into the receiving kettle 14. When the block 58 passes the roller connected to the casing 31, the standing pressure in the pipe 34 causes the piston to move the gate 16 of the kettle 13 to its closed position. The block 58 then comes in contact with the roller 48 that controls the valve in the casing 32 which operates the gate in the kettle 12. The same action takes place when the block 58 is moved into engagement with the roller 48 that controls the valve in the casing 33 so as to open the gate in the top kettle 11. When the gate 16 in the top kettle 11 closes, it causes the latch 63 to be actuated, thus moving the rocking bar 66 about its pivot 67 which raises the arms 74 so as to open the gate 77 under the conveyor 18. The kettle 11 is then supplied with the proper amount of material so as to fill all the presses that are served by the cooker and when this amount is reached, the paddle 84 actuates the rod 87 so as to release the pawl 83 and allow the weighted arm 74 to drop, so as to close the gate 77.

It will be seen, that by reason of the present construction, means are provided for obtaining a full discharge of each kettle to the adjacent kettle at predetermined intervals, thus insuring a uniform cooking of the material. Moreover, all the operating parts are located outside of the cooker so as to be readily accessible. The cooked material may be conducted from the receiving kettle 14 at predetermined intervals to the presses.

In order to cut off the supply of steam when the material in kettle 12 discharges into kettle 13, the steam supply valve 96 is operatively connected to the valve gates in the kettles 11 and 12 in such a manner that when the gate in kettle 12 is moved to its open position, the arm 108 is actuated, so as to release engagement of the arm 103 with lever 98, thus causing the valve stem 97 to be lowered, to cut off the supply of steam to the sweep. When the discharge of kettle 12 has been completed, the gate 16 in this kettle closes and immediately, the gate in kettle 11 is opened so as to empty into the kettle 12.

As the gate in kettle 11 opens, it engages the rocker arm 109, thus actuating the cables 111 so as to raise the lever 98 and the valve stem 97 which opens the valve to allow the steam to pass through the hollow shaft 93. When the lever 98 is raised, the arm 103 falls forward and engages it, so as to maintain the valve stem 97 in its upward or open position. The supply of steam through the hollow shaft 93 to the sweep in cooker will continue until the gate in the kettle 12 is again opened.

In addition to the stem supplied to the hollow shaft and revolving sweeps in the kettles as described, steam is also supplied to the bottoms and sides of the jackets of each kettle through pipes not shown. The condensation that takes place in the jackets of the kettles may be drained off through suitable pipes not shown.

It is to be understood, that the form of the invention herewith shown and described, is merely illustrative of a preferred embodiment and that such changes may be made as fall within the purview of one skilled in the art without departing from the spirit of the invention and the scope of the appended claims.

I claim:

1. A cooker of the class described comprising a series of superimposed kettles having openings communicating the adjacent kettles with one another, a gate associated with each opening for controlling the flow of material therethrough, means operatively connected to each of said gates for actuating the gates at predetermined intervals whereby when the contents of one kettle is being delivered into the adjacent lower kettle, the supply of the upper adjacent kettle is cut off therefrom, and means for supplying steam to the kettles, and means for cutting off the supply of steam to each kettle when the material is being discharged therefrom and delivering steam to the kettle when the latter is being filled.

2. A cooker of the class described comprising a series of superimposed kettles having openings communicating the adjacent kettles with one another, a gate associated with each opening for controlling the flow of material therethrough, means operatively connected to each of said gates for sequentially actuating the gates at predetermined intervals whereby when the contents of one kettle is being delivered into the adjacent lower kettle, the supply of the upper adjacent kettle is cut off therefrom, means for supplying steam to the kettles and means operatively connected to the gates for cutting off the supply of steam to each kettle when the material is being discharged therefrom.

3. A cooker of the class described comprising a series of superimposed kettles having openings communicating the adjacent kettles with one another, a slidable gate associated with each opening for controlling the flow of material therethrough, reciprocating means operatively connected to each of the gates for sequentially actuating the gates at predetermined intervals, a supply conveyor delivering to the top kettle, a grate controlling the flow of the supply from the conveyor to the top kettle, means operatively connecting the gate in the top kettle to the conveyor gate for opening the latter when the former closes, means supplying steam to the kettles, and means operable by the movement of the gates for cutting off the supply to each kettle when the material is being discharged therefrom and delivering steam to the kettle when the latter is being filled.

4. A cooker of the class described comprising a series of superimposed kettles having openings communicating the adjacent kettles with one another, a slidable gate associated with each opening for controlling the flow of material therethrough, reciprocating means operatively connected to each of the gates for sequentially actuating the gates at predetermined intervals, a supply conveyor delivering to the top kettle, a gate controlling the flow of the supply from the conveyor to the top kettle, means operatively connecting the gate in the top kettle to the gate in the conveyor, whereby when the former is moved to its closed position the latter is opened, locking means for maintaining the conveyor gate in its opened position, means when the supply in the top kettle reaches a predetermined amount for releasing the locking means so as to close the conveyor gate, means supplying steam to the kettles, and means operable by the movement of the gates for cutting off the supply of steam to each kettle when the material is being discharged therefrom.

5. In combination with a cooker having a series of superimposed kettles provided with openings in the bottom thereof for communicating the adjacent kettles with one another, a slidable gate controlling the flow of supply through each opening, a fluid pressure actuating piston connected to each of the gates, means supplying pressure to opposite sides of the piston, a valve for controlling the supply of pressure to one side of the piston, and movable reciprocating means arranged to actuate the valves controlling the supply of pressure to each of the pistons, whereby the gates are sequentially actuated to open and close at predetermined intervals.

6. In combination with a cooker having a series of superimposed kettles having openings in the bottom thereof for communicating the adjacent kettles with one another, a gate controlling the flow of supply through each opening, a fluid pressure actuating piston connected to each of the gates, means supplying pressure to opposite sides of the piston, a valve for controlling the supply of pressure to one side of the piston, a movable reciprocating member arranged to actuate sequentially the valves controlling the flow of pressure to each of the pistons, means for moving the said member past each of the valves and means for returning the said member to its initial position.

7. In combination with a cooker having a series of superimposed kettles having openings in the bottom thereof for communicating the adjacent kettles with one another, a gate controlling the flow of supply through each opening, a fluid pressure actuating piston connected to each of the gates, means supplying pressure to opposite sides of the piston, a valve for controlling the supply of pressure to one side of the piston, a slidable reciprocating block arranged to actuate sequentially the valves controlling the flow of pressure to each of the pistons, means for moving the slidable block past each of the valves and means for returning the slidable block to its initial position.

8. A cooker of the class described comprising a series of superimposed kettles having openings communicating the adjacent kettles with one another, a slidable gate associated with each opening for controlling the flow of material therethrough, a fluid pressure actuating piston operatively connected to each of said gates, means supplying pressure to opposite sides of the piston, a series of valves controlling the flow of pressure to each of the pistons, said valves each having a pipe communicating with one side of the piston so as to normally maintain the gate in its closed position and a variable pressure means communicating with the opposite side of the piston, to cause the gate to be moved to its opened position, a valve stem extending from each of the valves to control the supply of pressure to opposite sides of the piston, and movable means for sequentially actuating the valve stems, whereby when the contents of one kettle is being delivered into the adjacent lower kettle, the supply of the upper adjacent kettle is cut off therefrom.

9. A cooker of the class described comprising a series of superimposed kettles having openings communicating the adjacent kettles with one another, a slidable gate associated with each opening for controlling the flow of material therethrough, a fluid pressure actuating piston operatively connected to each of said gates, means supplying pressure to opposite sides of the piston, a series of valves controlling the flow of pressure to each of the pistons, said valves each having a pipe communicating with one side of the piston so as to normally maintain the gate in its closed position and a variable pressure means communicating with the opposite side of the piston, to cause the gate to be moved to its opened position, a valve stem extending from each of the valves to control the supply of pressure to opposite sides of the piston, a movable block for sequentially actuating the valve stems, means for bringing the block into operative engagement with the valve stems, and means for returning the block to its starting position.

10. A cooker of the class described comprising a series of superimposed kettles having openings communicating adjacent kettles with one another, a gate associated with each opening for controlling the flow of material therethrough, a cylinder having a fluid pressure actuating piston operatively connected with each of the gates, means supplying a standing pressure to one side of the piston for normally maintaining the gates closed, a valve member associated with each cylinder for varying the supply of pressure on opposite sides of the piston, a valve stem extending from each of the valve members and arranged when moved inwardly to cause a preponderance of pressure to be supplied to the other side of said piston so as to move the gate open, a movable block arranged sequentially to actuate the valve stems of each of the valve members, and means for moving the block into operative engagement with each valve stem.

11. A cooker of the class described comprising a series of superimposed kettles having openings communicating adjacent kettles with one another, a gate associated with each opening for controlling the flow of material therethrough, a cylinder having a fluid pressure actuating piston operatively connected with each of the gates, means supplying a standing pressure to one side of the piston for normally maintaining the gates closed, a valve member associated with each cylinder for varying the supply of pressure on opposite sides of the piston, a valve stem extending from each of the valve members and arranged when moved inwardly to cause a preponderance of pressure to be supplied to the other side of said piston so as to move the gate open, a movable block arranged sequentially to actuate the valve stems of each of the valve members, means for moving the block into operative engagement with each valve stem, and means for returning the block to its initial position.

12. A cooker of the class described comprising a series of superimposed kettles having openings communicating adjacent kettles with one another, a gate associated with each opening for controlling the flow of material therethrough, a cylinder having a fluid pressure actuating piston operatively connected with each of the gates, means supplying a standing pressure to one side of the piston for normally maintaining the gates closed, a valve member associated with each cylinder for varying the supply of pressure on opposite sides of the piston, a valve stem extending from each of the valve members and arranged when moved inwardly to cause a preponderance of pressure to be supplied to the other side of said piston so as to move the gate open, a movable block arranged sequentially to actuate the valve stems of each of the valve members, and means for manually returning the block to its starting position.

In testimony whereof I have hereunto set my hand.

JOSEPH DAVIDSON.